W. S. BELDING.
ARTIFICIAL BAIT.
APPLICATION FILED DEC. 13, 1915.

1,204,538.

Patented Nov. 14, 1916.

WITNESS
O. Johnson

INVENTOR
Warren S. Belding

UNITED STATES PATENT OFFICE.

WARREN S. BELDING, OF SEATTLE, WASHINGTON, ASSIGNOR OF ONE-HALF TO FRANK WARREN, OF SEATTLE, WASHINGTON.

ARTIFICIAL BAIT.

1,204,538.  Specification of Letters Patent.  Patented Nov. 14, 1916.

Application filed December 13, 1915. Serial No. 66,635.

*To all whom it may concern:*

Be it known that I, WARREN S. BELDING, citizen of the United States, residing at Seattle, in the county of King and State of Washington, have invented a certain new and useful Improvement in Artificial Bait, of which the following is a specification.

My invention relates to improvements in artificial bait of the class which is employed in catching fish, and the object of my invention is to provide an artificial bait within which is embodied fish-hooks and mechanism associated therewith which normally are so disposed in recesses therein that when such bait is attached to a fish line it may be cast in a body of water among weeds and brush and drawn therethrough without any liability of its hooks engaging with or being caught on such weeds and brush or on other obstructions within the water, but if such bait then be seized by a fish to cause additional strain on its fish line then such mechanism shall be actuated to project its associated fish-hooks outwardly from their recesses to catch such fish.

A further object of my invention is to provide an artificial bait which shall be simple in construction and inexpensive to manufacture.

I attain these objects by devices illustrated in the accompanying drawings in which—

Figure 1:
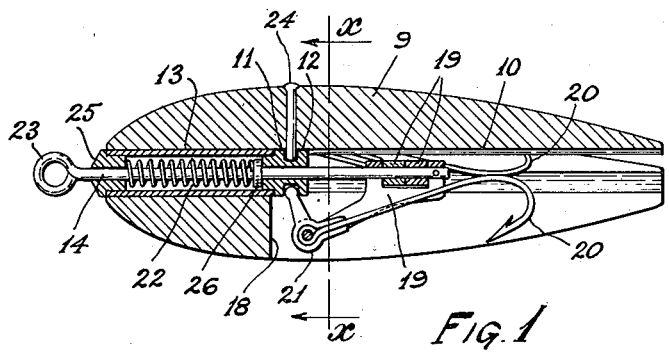
Figure 2:
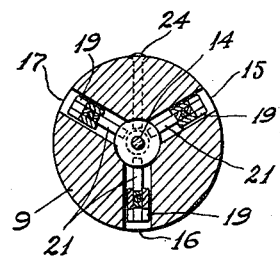
Figure 3:
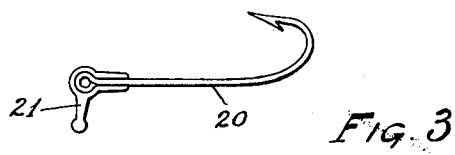
Figure 4:
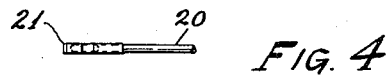

Figure 1 illustrates an artificial bait embodying my invention wherein some operative parts are shown in side elevation as associated with the body portion which is illustrated by a view in longitudinal mid-section; Fig. 2 is a view of the same in cross-section on broken line *x, x* of Fig. 1; Fig. 3 is a view in side elevation of a detail of the same; Fig. 4 is a fragmentary view of the detail shown in Fig. 3; and Figs. 5, 6, 7 and 8 illustrate parts of my invention as they appear each at one stage in the process of their construction.

Referring to the drawings, throughout which like reference numerals indicate like parts, in Fig. 1, 9 indicates a cigar-shaped body portion of an artificial bait, preferably made of soft, light wood and coated with paint to have a shiny surface to adapt it to attract attention of fish. Extending longitudinally through said body portion 9 is a concentrically disposed hole 10 within which hole 10 at a point near the central portion of the length of the body portion 9 is a bushing which is provided with two flanges 11 and 12, said bushing being secured in its position by a pin 24 which extends from the outer surface of the body portion 9 into the groove formed by the flanges 11 and 12 of said bushing. Attached to the flange 11 of said bushing is the inner end of a metal tube 13 and flush with the end surface of the body portion 9 is the outer end of the tube 13 which outer end is provided with another bushing 25. Extending through said tube 13 is a shaft 14 which is provided with an eye 23 to which a fish line, not shown, may be attached, and which shaft 14 is extended in said hole 10 toward the rear end of the body portion 9. Extending between said hole 10 and the periphery of the body portion 9 in radial planes that are equi-distant one from the others are three slots 15, 16 and 17 which extend lengthwise the body portion 9 from the end of the body portion 9 to a point indicated by the numeral 18 near the forward end portion of said body portion 9 as shown in Fig. 1.

Figure 5:
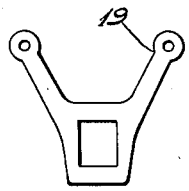
Figure 6:
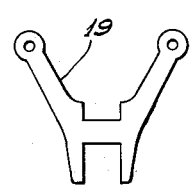
Figure 7:
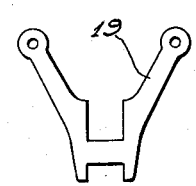
Figure 8:
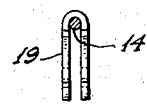

On the rear end of the shaft 14 are secured three arms 19 disposed in planes radiating from said shaft 14 which arms 19 are formed by stamping sheet metal each into the forms respectively shown in Figs. 5, 6 and 7, and then bending such stamped pieces around the shaft 14 in the manner indicated in Figs. 1 and 8 whereon they are supported in a hinge-like manner, thus to form bifurcated arms between the ends of the bifurcated members of which are articulated fish-hooks 20 whose articulated ends are each provided with a bifurcated arm 21 which is disposed to engage with the flanges 11 and 12, whereby a lengthwise movement of the shaft 14 will cause the hooks 20 to project outwardly from the slots 15, 16 and 17 of the body portion 9 or be drawn therewithin according to the direction of such movement. Disposed upon the shaft 14 is fixed a collar 26 and between said collar 26 and the bushing 25 of the tube 13 is disposed a helical compression spring 22 which surrounds the shaft 14 whereby its force may tend always to maintain the hooks 20 within their slotted recesses 15, 16 and 17 and the shaft 14 in its rearwardmost position, as shown in Fig. 1.

In Fig. 4 I have shown one plan of securing the articulated end of the hook 20 with the bifurcated arms 21 the joined surfaces being soldered together.

Obviously the mode of operation of my structure is as follows: A fish line is attached to the eye 23 and when the structure is drawn through the water normally the friction of the water on the body 9 will not be sufficient to overcome the force of the helical spring 22 therefore the hooks 20 will be maintained in their slotted recesses but if the body portion 9 be seized by a fish, then, in such case, the strain on the fish line on the shaft 14 will compress the helical spring 22, while the arms 19 move forward to actuate the hooks 20 to project outwardly from their recesses to catch the fish. Manifestly, if it be desired, for some condition of use, only one slot, like slots 15, 16 and 17, need be provided in a body portion, like body portion 9, and within such slot may be disposed a single fish-hook operatively associated with mechanism actuated in response to the relative movement of a centrally disposed shaft, like shaft 14, whereby such single hook may be effective in the operation of catching fish, and other changes may be made in the form, dimensions and arrangement of parts of my invention without departing from the spirit thereof.

What I claim is:

An artificial bait of the class described, which embodies a cigar shaped body portion having a hole that extends through it in a lengthwise direction and having radially disposed slots which extend between said hole and the outer surface of said body portion throughout a portion of its length; a shaft disposed to be movable in an endwise direction in said hole; hook supporting arms made of sheet metal, all parts of each of which are integral with each other and each of which is formed to have two members united by a connecting strip and each of which is disposed on said shaft with said connecting strip bent to make a semi-circular engagement with said shaft whereby said two members are disposed side by side and spaced from each other and whereby said two members may project into one of said radially disposed slots; and a fish hook pivotally secured between the outer end portions of said two members.

In witness whereof, I hereunto subscribe my name this 8th day of December A. D., 1915.

WARREN S. BELDING.

Witnesses:
FRANK WARREN,
O. JOHNSON.